United States Patent [19]
Forbes et al.

[11] Patent Number: 5,821,722
[45] Date of Patent: Oct. 13, 1998

[54] MULTIPHASE ELECTRICAL MOTOR, CONTROL AND METHOD USING OVERLAPPING CONDUCTION PERIODS IN THE WINDINGS

[75] Inventors: Franklin L. Forbes, LaOtto; Ronald J. Krefta, Noblesville, both of Ind.; Amritlal H. Patel, Anaheim, Calif.

[73] Assignee: General Electric Company, Fort Wayne, Ind.

[21] Appl. No.: 466,579

[22] Filed: Jun. 6, 1995

[51] Int. Cl.$^6$ .................................................. H02P 8/00
[52] U.S. Cl. ........................... 318/696; 318/254; 318/439
[58] Field of Search ................................. 318/696, 685, 318/254, 138, 439

[56] References Cited

U.S. PATENT DOCUMENTS

| | | | |
|---|---|---|---|
| 4,005,347 | 1/1977 | Erdman | 318/254 |
| 4,015,182 | 3/1977 | Erdman | 318/334 |
| 4,016,468 | 4/1977 | Graf | 318/434 |
| 4,169,990 | 10/1979 | Lerdman | 318/138 |
| 4,390,826 | 6/1983 | Erdman et al. | 318/439 |
| 4,449,079 | 5/1984 | Erdman | 318/138 |
| 4,491,772 | 1/1985 | Bitting | 318/254 |
| 4,494,055 | 1/1985 | Bitting et al. | 318/254 |
| 4,499,408 | 2/1985 | Bitting et al. | 318/254 |
| 4,500,821 | 2/1985 | Bitting et al. | 318/254 |
| 4,513,230 | 4/1985 | Erdman | 318/254 |
| 4,532,459 | 7/1985 | Erdman et al. | 318/138 |
| 4,556,827 | 12/1985 | Erdman | 318/254 |
| 4,558,264 | 12/1985 | Weischedel | 318/254 |
| 4,609,953 | 9/1986 | Mizuno et al. | 360/78 |
| 4,642,537 | 2/1987 | Young | 318/254 |
| 4,725,720 | 2/1988 | Sawada et al. | 250/201 |
| 4,757,241 | 7/1988 | Young | 318/254 |
| 4,926,099 | 5/1990 | Ricker et al. | 318/254 |
| 4,933,584 | 6/1990 | Harms et al. | 310/162 |
| 4,950,960 | 8/1990 | Krefta et al. | 318/254 |
| 5,023,527 | 6/1991 | Erdman et al. | 318/254 |
| 5,221,881 | 6/1993 | Cameron | 318/254 |
| 5,446,517 | 8/1995 | Murakami et al. | 354/400 |
| 5,569,989 | 10/1996 | Acquaviva | 318/254 |

*Primary Examiner*—Brian Sircus
*Attorney, Agent, or Firm*—Wayne O. Traynham

[57] ABSTRACT

A motor has a stationary assembly including three windings in magnetic coupling relation to a rotatable assembly, the position of which is sensed by a position sensor. A converter, adapted to be coupled to a power supply, energizes each of the windings with a voltage. The converter is responsive to the angular position and speed of the rotatable assembly for selectively energizing each of the windings according to a preselected sequence. The converter energizes each winding with the voltage throughout a commutation period when a back EMF induced in such winding has a polarity opposite to a polarity of the voltage energizing such winding, the commutation period for each winding overlapping the commutation period for another winding. Alternatively, the converter energizes each winding with the voltage throughout a commutation period of 180 electrical degrees, the commutation period for each winding overlapping the commutation period for another winding. As a result, torque ripple in the rotation of the rotatable assembly is reduced.

4 Claims, 4 Drawing Sheets

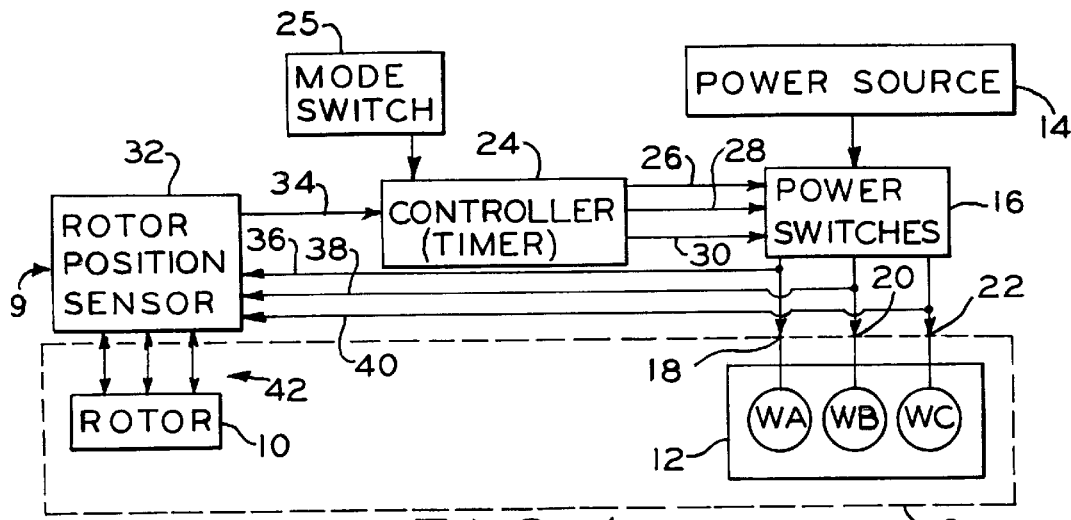
FIG_1
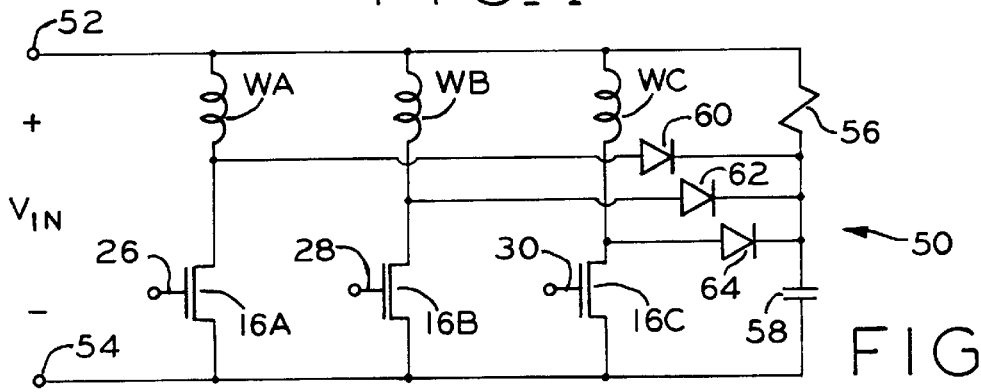
FIG_2
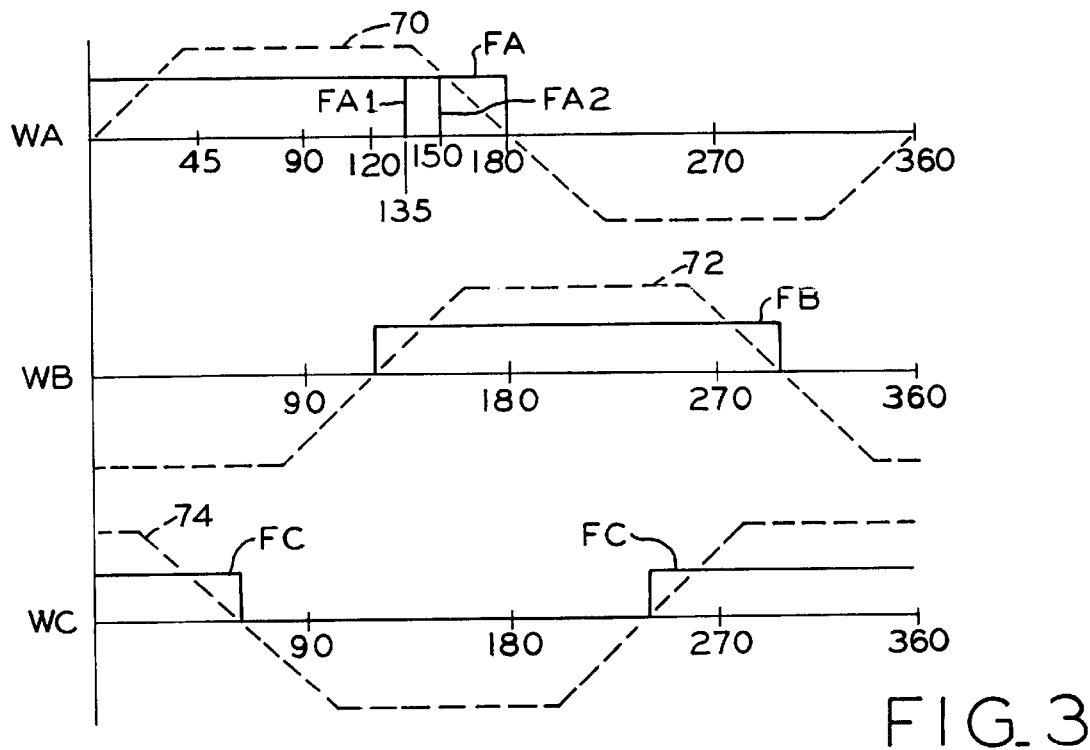
FIG_3

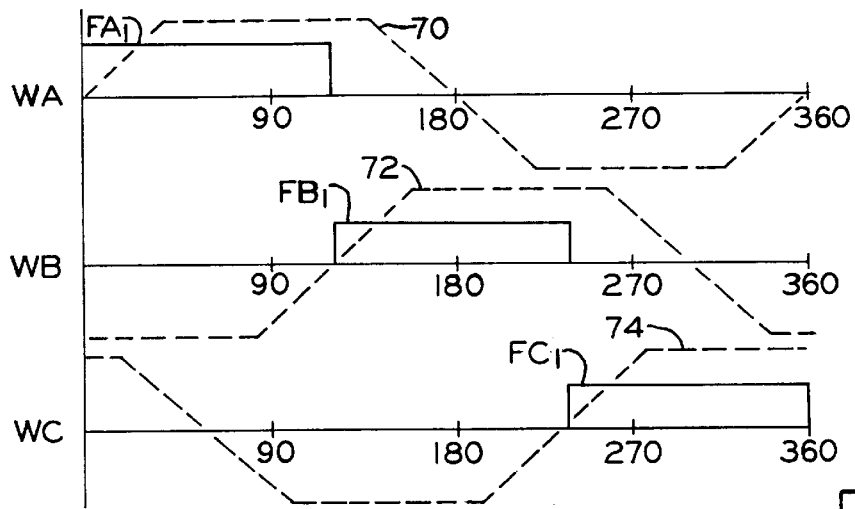
FIG_4
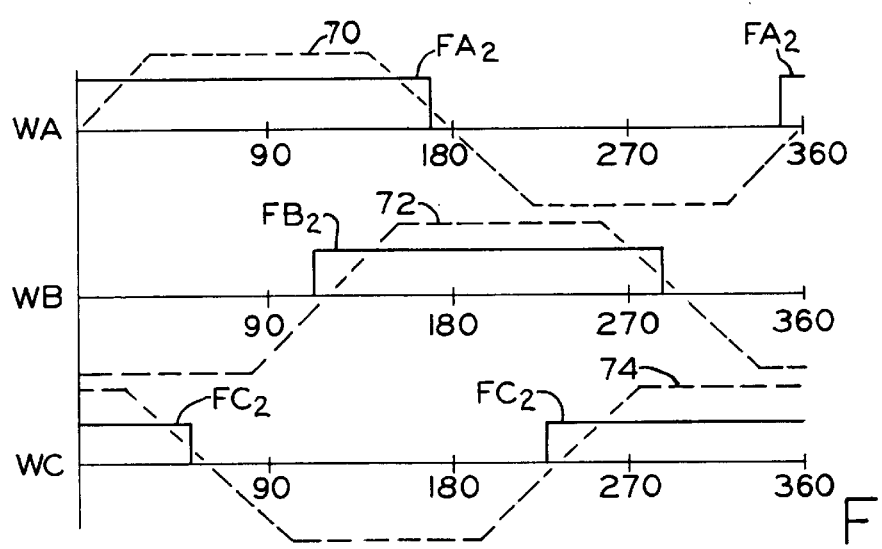
FIG_5
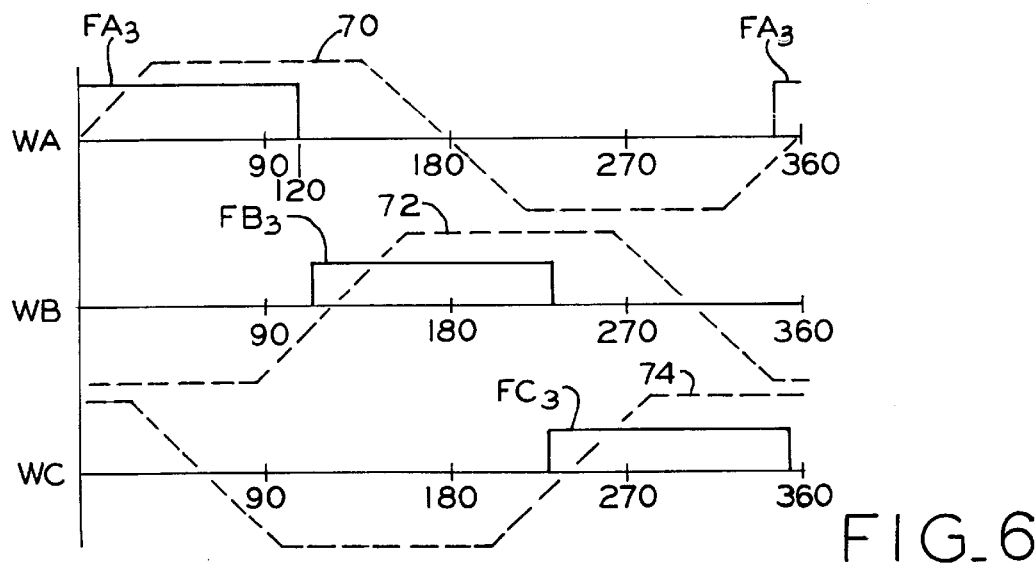
FIG_6

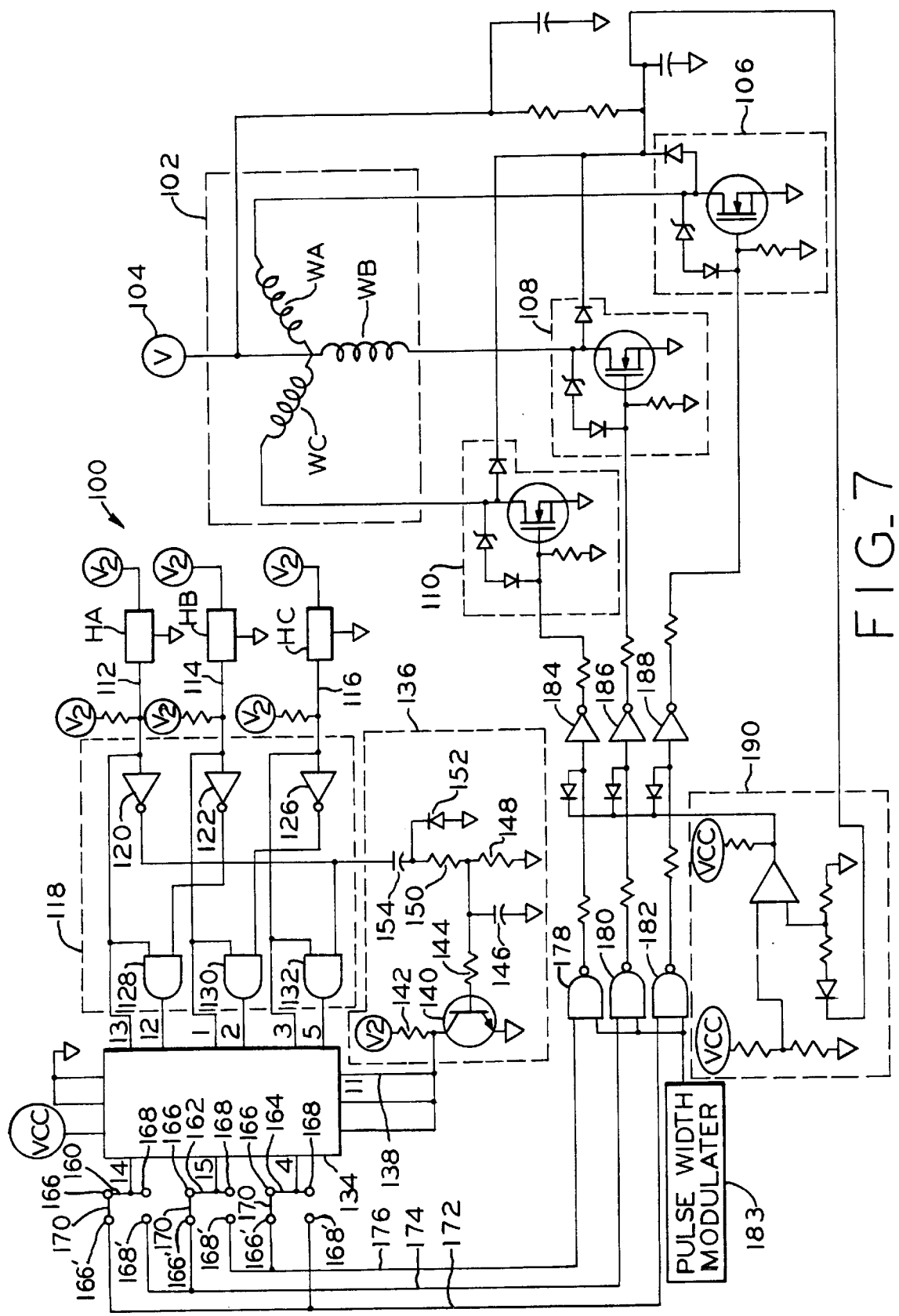
FIG._7

MULTIPHASE ELECTRICAL MOTOR, CONTROL AND METHOD USING OVERLAPPING CONDUCTION PERIODS IN THE WINDINGS

BACKGROUND OF THE INVENTION

This invention generally relates to electronically commutated motors and, in particular, to such motors energized by overlapping commutation periods.

Three phase electrical motors have long been in use wherein each of the three windings is energized for 120 degrees as set by Hall devices. In order to avoid problems where no torque is produced during starting, the Hall devices are positioned such that each winding is energized when the back EMF is above zero. The delayed energization of the windings caused by this, however, does not allow current to build up in the windings to desired levels for operation at high rotor speeds.

SUMMARY OF THE INVENTION

Among the objects of the present invention are to provide improved electrical motors which are reliable, durable and compact; to provide improved electrical motors which start smoothly and reliably; to provide improved electrical motors which have high starting torque; to provide improved electrical motors which have high running torque; to provide improved electrical motors which operate with reduced torque ripple; and to provide improved electrical motors which are inexpensive to manufacture and efficient to operate.

Generally, one aspect of the invention is a motor including a stationary assembly and a rotatable assembly in magnetic coupling relation thereto, the stationary assembly including at least three windings. The rotation of the rotatable assembly induces a back EMF in the windings. A position sensor senses an angular position of the rotatable assembly relative to the stationary assembly. A converter, adapted to be coupled to a power supply, energizes each of the windings with a voltage. The converter is responsive to the angular position of the rotatable assembly as sensed by the position sensor for selectively energizing each of the windings according to a preselected sequence. The converter energizes each winding with the voltage such that the commutation period for each winding overlaps the commutation period for another winding thereby reducing torque ripple in the rotation of the rotatable assembly.

Another aspect of the invention is a motor comprising a stationary assembly and a rotatable assembly in magnetic coupling relation thereto, the stationary assembly including at least three windings. The rotation of the rotatable assembly induces a back EMF in the windings. A position sensor senses an angular position of the rotatable assembly relative to the stationary assembly. A converter, adapted to be coupled to a power supply, energizes each of the windings with a voltage. The converter is responsive to the angular position of the rotatable assembly as sensed by the position sensor for selectively energizing each of the windings according to a preselected sequence. The converter energizes each winding with the voltage throughout a commutation period of at least 120 electrical degrees.

Another aspect of the invention is a motor comprising a stationary assembly and a rotatable assembly in magnetic coupling relation thereto, the stationary assembly including windings, the rotation of the rotatable assembly inducing a back EMF in the windings. A position sensor senses an angular position of the rotatable assembly relative to the stationary assembly. A circuit produces a speed signal dependent on the rotational speed of the rotatable assembly. A converter, adapted to be coupled to a power supply, energizes each of the windings with a voltage. The converter is responsive to the angular position of the rotatable assembly as sensed by the position sensor and responsive to the speed signal produced by the circuit for energizing each of the windings according to a preselected sequence. The converter has a first mode of operation when the rotational speed of the rotatable assembly is below a predetermined value and has a second mode of operation when the rotational speed of the rotatable assembly is above the predetermined value. In the first mode the converter energizes each of the windings with the voltage such that the commutation period for each winding overlaps the commutation period for another winding. In a second mode the converter energizes each of the windings with the voltage such that the commutation period for each winding do not overlap the commutation period for another winding.

Another aspect of the invention is a motor comprising a stationary assembly and a rotatable assembly in magnetic coupling relation thereto, the stationary assembly including at least three windings, the rotation of the rotatable assembly inducing a back EMF in the windings. A position sensor senses an angular position of the rotatable assembly relative to the stationary assembly. A circuit produces a speed signal dependent on the rotational speed of the rotatable assembly. A converter, adapted to be coupled to a power supply, energizes each of the windings with a voltage. The converter is responsive to the angular position of the rotatable assembly as sensed by the position sensor and is responsive to the speed signal produced by the circuit, for selectively energizing each of the windings according to a preselected sequence. The converter has a first mode of operation when the rotational speed of the rotatable assembly is below a predetermined value and has a second mode of operation when the rotational speed of the rotatable assembly is above the predetermined value. In the first mode the converter energizes each of the windings with the voltage during a first commutation period of about 150–180 electrical degrees. In the second mode the converter energizes each of the windings with the voltage during a second commutation period of about 120 electrical degrees, whereby operating the motor in the first and second modes is more efficient than operating the motor in only the first mode and whereby operating the motor in the first and second modes produces higher startup torque than operating the motor in only the second mode.

Another aspect of the invention is motor comprising a stationary assembly and a rotatable assembly in magnetic coupling relation thereto, the stationary assembly including at least three windings, the rotation of the rotatable assembly inducing a back EMF in the windings, each back EMF signal having a substantially flat top beginning when the back EMF signal reaches an approximately peak and ending when the back EMF signal decays from the approximate peak. A position sensor senses an angular position of the rotatable assembly relative to the stationary assembly. A converter, adapted to be coupled to a power supply, energizes each of the windings with a voltage. The converter is responsive to the angular position of the rotatable assembly as sensed by the position sensor for selectively energizing each of the windings according to a preselected sequence. The converter energizes each winding with the voltage during a commutation period when the back EMF induced in such winding is the opposite polarity to the voltage energizing such winding, the commutation period for each winding ending at or after the ending of the flat top.

A control circuit and method of operation relating to the above inventions is also described.

Other objects and features will be in part apparent and in part pointed out hereinafter.

BRIEF DESCRIPTION OF THE DRAWINGS

FIG. 1 shows a block diagram for a motor control circuit of the present invention.

FIG. 2 shows an electrical schematic diagram for a three phase inverter circuit controlling the energization of the windings in a motor of the present invention.

FIGS. 3–6 are wave form diagrams which show the control signals for energizing the windings in the motor shown in FIGS. 1 and 2 as well as the back EMF signals produced by the windings according to rotor position along the x-axis.

FIG. 7 shows a schematic diagram of a motor control circuit of the present invention.

Corresponding reference characters indicate corresponding parts throughout the several views of the drawings.

DETAILED DESCRIPTION OF PREFERRED EMBODIMENTS

Figure 8:
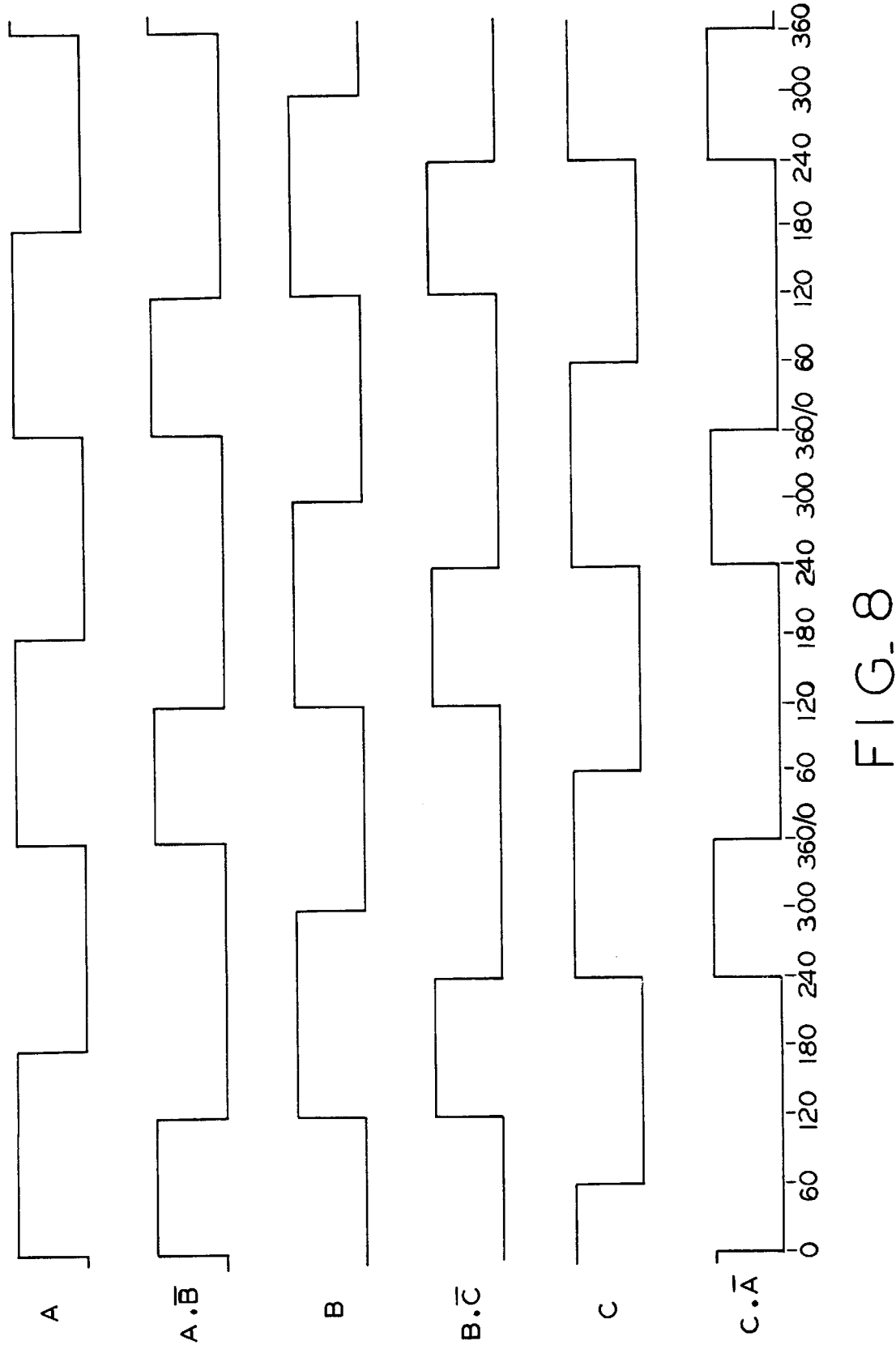
FIG. 8 shows a timing diagram for energizing the windings of the motor shown in FIG. 7.

FIG. 1 shows a control circuit 9 for controlling a motor 8 having a rotor 10 and a stator 12. Motor 8 may be a single or variable speed motor such as a brushless DC motor including electronically commutated motors and switched reluctance motors. Motor 8 may also provide finite, discrete rotor speeds selected by an electrical switch or the like (not shown). Stator 12 includes windings WA, WB and WC for inducing a magnetic field for rotating rotor 10. A power source 14 supplies electrical power to power switches 16 for separately energizing windings WA, WB and WC via lines 18, 20 and 22, respectively, and a neutral connection (shown in FIG. 2). Power switches 16 are separately controlled by a controller 24 via lines 26, 28 and 30. A rotor position sensor 32 preferably mounted on the stator 12 senses the angular position of rotor 10 relative to the stator 12 and outputs a corresponding rotor position signal via a line 34 to controller 24. Controller 24 controls power switches 16 to separately energize windings WA, WB and WC as a function of the rotor position signal. Rotor 10 is thereby caused to rotate. Rotor position sensor 32 may be a back EMF position sensor for sensing the position of the rotor based on the back EMF signals induced in windings WA, WB and WC via lines 36, 38 and 40, respectively. In the alternative, rotor position sensor 32 may comprise a plurality of Hall devices for sensing the position of rotor 10 via field lines indicated by general reference character 42. An optional mode selector switch 25 allows the user to select between several modes of operation as explained more fully below.

In one mode of operation, controller 24 energizes each of windings WA, WB and WC during the entire 180° of rotation of rotor 10 beginning at a zero crossing or zero torque point when the back EMF produced by each such winding transitions from the "same" polarity to the "opposite" polarity to the energizing voltage. The "same" and "opposite" polarity refer to a circuit analysis perspective; "opposite" polarity means that the induced back EMF opposes or subtracts from the energizing or driving voltage to produce positive torque. This point when the back EMF transitions from the "same" polarity to "opposite" polarity is frequently referred to as the zero crossing or zero torque point. In general, torque in a winding is the vector product of the driving current and the back EMF. Therefore, positive driving current and a positive back EMF produce a positive torque. If either the driving current or the back EMF is negative and the other is positive, the negative torque is produced. If both the driving current and the back EMF are negative, the torque is positive. Since the back EMF subtracts from the driving voltage during commutation periods when producing positive torque, the back EMF is said to have an "opposite" polarity to the polarity of the driving voltage. For example, if the back EMF signals 70, 72, 74 have a wave form as shown in FIG. 3, and if the energizing voltages have a rectangular pulsed wave form, then the combined wave forms would be as shown by FIG. 3 with the firing signals FA, FB and FC inverted.

The advantage of energizing windings WA, WB and WC during such 180° periods is that rotor 10 has a higher output torque due to the larger angular extent over which current flows through each winding as compared to a conventional motor which is energized for 120°. Starting torque is also increased because there is always an energized winding which is at a peak or near a peak in its back EMF profile. Accordingly, the back EMF current product is high and a large starting torque results.

A further advantage of using 180° energization periods is that the periods can be set by controller 24 to commence prior to the zero crossing of the back EMF wave form for each winding to be energized. This allows for a higher running torque without impacting the starting torque. This occurs because the turn on point for power switches 16 is set so that the back EMF helps push current into the respective winding rather than opposing the flow of current. Because the current rise in a winding is related to the difference in voltage between the applied voltage and the back EMF voltage divided by the inductance of the winding, the earlier turn on of the winding provides a greater voltage difference and, therefore, a faster current rise in the winding.

A further advantage of using 180° energization periods is that torque ripple is decreased because the torque producing back EMF from each winding is decreasing while the back EMF from the next winding to be energized is increasing. Since the back EMF in successively energized windings change in a near linear fashion, with currents approaching square waves, the sum of the torques produced by the two "on" phases approximates a constant torque.

After start up and rotor 10 has reached a predetermined speed of rotation, controller 24 changes to a second mode of operation where windings WA, WB and WC are energized for 120° periods. The 120° periods can begin at the cross-over point in the back EMF signal for each respective winding or, preferably, they can be advanced even further to begin even before the cross-over point. Again, this advancement in the energization of the windings advantageously uses the back EMF produced in a winding to more quickly build up the energization current in the winding.

FIG. 2 shows a half bridge drive circuit with the number of power transistors equal to the number of windings. Unlike a conventional half bridge drive circuit, however, each winding is operated over the entire 180° that the back EMF signal produce in the winding is positive rather than only 120° as in conventional drive circuits. The advantage of the half wave bridge is lower cost and smaller size.

More particularly, FIG. 2 shows a drive circuit indicated by general reference character 50 which includes terminals 52 and 54 for connecting a direct current (DC) supply to circuit 50. Circuit 50 also includes a winding WA connected in series with a power transistor 16A across positive voltage terminal 52 and neutral connection terminal 54. Windings WB and WC are also respectively connected in series with power transistors 16B and 16C across terminals 52 and 54. A resistor 56 and a capacitor 58 are also connected in series across terminals 52 and 54 for storing commutation energy and for dissipating excess energy generated during rotation of the rotor. A diode 60 is connected at one end between winding WA and power transistor 16A and is connected at the other end between resistor 56 and capacitor 58. Diodes 62 and 64 are similarly connected at one end between winding WB and power transistor 16B and winding WC and power transistor 16C, respectively, and at the other end between resistor 56 and capacitor 58.

The circuitry of FIG. 2 may be interconnected with the circuitry shown in FIG. 1 for controlling and energizing windings WA, WB and WC. FIG. 3 shows a timing diagram for so energizing windings WA, WB and WC according to the invention. In particular, the wave form corresponding to the reference letter WA shows the firing signal FA during which time power transistor 16A in FIG. 2 is turned on, thus energizing winding WA. The dashed line 70 shows the back EMF signal produced by winding WA during a full 360° rotation. As shown, back EMF signal 70 is positive during the 180° of rotation during energization and is negative during the remaining 180° of rotation. The timing diagram for windings WB and WC are shown below the timing diagram for winding WA in FIG. 3. Firing signal FB shows the 180° of rotation during which winding WB in FIG. 2 is energized. A dashed line 72 shows the back EMF signal produced by winding WB. Likewise, firing signal FC shows the 180° of rotation when power transistor 16C is rendered conductive and winding WC is energized. A dashed line 74 shows the back EMF signal produced by winding WC. Therefore, FIG. 3 illustrates that power switches 16 and controller 24 constitute a converter which energizes each winding with a current throughout a commutation period when the back EMF induced in such winding is the opposite polarity to the voltage energizing such winding, the commutation period for each winding overlapping the commutation period for another winding thereby reducing torque ripple in the rotation of the rotatable assembly.

As shown in FIG. 3, the energization periods for the three windings overlap. This produces a higher output torque due to the larger angular extent over which current flows through the windings. Starting torque is also increased since there is always an energized winding which is at a peak, or near peak, in its back EMF profile. Therefore, the back EMF current product is high and a large starting torque results. In practice, the currents (and voltages) are not usually as square as the wave forms shown in FIG. 3. Therefore, energizing each winding for a full 180° during higher speeds may not always minimize the torque ripple because the current at the higher speeds does not built up as quickly as slower speeds.

In general, energizing each winding after the flat top of each back EMF signal during the period that the opposing back EMF is deteriorating or during the period when the opposing back EMF signal has a voltage less than the energizing voltage (i.e., after 150°) does not produce a significant amount of additional torque. For example, the flat top of the back EMF signal 70 of winding WA begins at about 45° and ends at about 135°. Energizing winding WA after 135°, and particularly between 150° and 180°, does not produce a significant amount of additional torque. Therefore, to maximize the power output by the motor, one preferred embodiment contemplates that energization would be cut off between 135°–150°, preferably 150°. Line FA4 illustrates cutting off the firing signal and energization of winding WA at 135°. Line FA5 illustrates cutting off the firing signal and energization of winding WA at 150°. A cutoff at approximately the end of the flat top at 135°–150° will optimize both torque density and efficiency of the motor. A cutoff before the end of the flat top tends to reduce motor torque density and a cutoff after the end of the flat top tends to reduce motor efficiency. The energization may be cut off by controller 24 responsive to a circuit detecting the back EMF signal or by operation of a timer which is part of controller 24. If a timer is used, a separate timer may be used for each winding or a single time may be used for all windings.

FIG. 4 shows a second mode of operation for the circuitry of FIGS. 1 and 2. In FIG. 4, a firing signal $FA_1$ starts at the same point in rotation as firing signal FA in FIG. 3 but ends 120° later instead of 135°–180° latter. Likewise, firing signals $FB_1$ and $FC_1$ begin at the same point in rotation as firing signals FB and FC, respectively, in FIG. 3 but end after only 120°. The firing signals shown in FIG. 4 do not provide for the overlapping energization of windings. In operation, controller 24 preferably starts up motor 8 using the first mode timing diagrams shown in FIG. 3 and then, after rotor 10 reaches a pre-determined speed, switches to the second mode of operation shown in FIG. 4. This allows motor 8 to operate more efficiently at higher speeds. A further advantage is that energization for each winding begins early when the back EMF for the winding reaches the cross-over point. This provides a greater voltage difference for the energizing current and allows the current to build more quickly in the windings. In a conventional three phase motor using 120° energization periods, to the contrary, the 120° periods customarily begin at the 30° mark and end at the 150° instead of beginning at the zero degree mark and ending at the 120° mark as shown in FIG. 4.

FIG. 5 shows a timing diagram for energizing the windings of motor 8 in FIG. 1 which is similar to the timing diagram shown in FIG. 3 except that the energization periods have been moved back behind the zero cross-over point. This allows the energization current to build even more quickly as a greater voltage difference is present in this earlier time period. Accordingly, firing signals $FA_2$, $FB_2$ and $FC_2$ provide 180° firing signals for windings WA, WB and WC respectively, which firing signals may commence 10° before the back EMF cross-over point and end 170° after the cross-over point.

FIG. 6 shows another set of firing signals $FA_3$, $FB_3$ and $FC_3$ for energizing windings WA, WB and WC. These firing signals are similar to firing signals $FA_1$, $FB_1$ and $FC_1$, respectively, except that firing signals $FA_3$, $FB_3$ and $FC_3$ begin 10° before the back EMF cross-over point and end 110° after the cross-over point. Again, the advantage of beginning energization earlier allows for a quicker build-up of energization current in the windings by taking advantage of the greater voltage difference. This is particularly advantageous during operation of motor 8 at higher speeds. As an alternative to the firing signals shown in FIGS. 3 and 4, controller 24 may preferably start up motor 8 in a first mode of operation using the firing signals shown in FIG. 5 and, after motor 8 has reached a pre-determined speed, convert to a second mode of operation using the firing signals shown in FIG. 6. Other combinations of these timing diagrams are also possible. For example, controller 24 could start up motor 8 using the firing signals shown in FIG. 3 and then, after motor 8 has reached a pre-determined speed, convert to a second mode of operation using the firing signals shown in FIG. 6. Likewise, the motor 8 could be started up using the firing signals shown in FIG. 5 and then operated at higher speeds using the firing signals shown in FIG. 4.

By energizing the windings prior to the cross-over point of the back EMF signal, a higher running torque is produced. This occurs because the transistor turn-off point is set so that the back EMF helps push current into the winding rather than oppose it. Accordingly, inductance is less of an issue.

A further variation allows the user to select the operating mode of the motor with mode switch 25. For example, when switch 25 is in a first position, motor 8 uses the firing signals shown in FIG. 3. When switch 25 is in a second position, motor 8 starts up with the firing signals shown in FIG. 3 and then runs at operating speed using the firing signals shown in FIG. 4. When switch 25 is in a third position, motor 8 uses the firing signals shown in FIG. 5. When switch 25 is in a fourth position, motor 8 starts up with the firing signals shown in FIG. 5 and then runs at operating speed using the firing signals shown in FIG. 6. Other combinations for operating motor 8 with the firing signals shown in FIGS. 3–6 are also possible, depending on the operating speed, torque and efficiency desired from motor 8.

It will also be understood by those skilled in the art that controller 24 of FIG. 1 can be used with a three winding motor powered with single phase power supply wherein the motor is started up in a first overlapping mode of operation by energizing the windings for 120°–180°, preferably 120°–150°, and then, after a selected speed is reached, converting to a second non-overlapping mode of operation where each of the windings is only energized for only 80°–120° (about two thirds of mode 1). Mode switch 25 can also be used to select other modes of operation as described above.

FIG. 7 shows a circuit 100 of the present invention adapted to operate off of the low voltage direct current electrical system commonly found in an automobile, truck, boat and the like. In particular, FIG. 7 shows a motor 102 having windings WA, WB and WC. The windings are connected at a common point for connection to a source of electrical power such as a 14 volt source 104. The other end of each of windings WA, WB and WC is connected to a power transistor circuit shown within dashed lines 106, 108 and 110, respectively. When each of the power transistor circuits is turned on or rendered conductive, current flows from voltage source 104, through the respective winding and through the respective power transistor circuit to energize the winding.

Circuit 100 also includes hall effect devices HA, HB and HC for sensing the position of the rotor of motor 102. The outputs of these hall effect devices are transmitted via lines 112, 114 and 116, respectively, to a logic circuit shown within a dashed line 118. Logic circuit 118 includes inverters 120, 122 and 126 as well as AND gates 128, 130 and 132. Logic circuit 118 has six output lines connected to pins 13, 12, 1, 2, 3 and 5 of an analog multiplexer 134. Using the logical notation for representing the output of hall device HA as "A", the output of hall device HB as "B", and the output of hall device HC as "C", then the signal received at pin 13 is A, the signal at pin 12 is A·$\overline{B}$, the signal at pin 1 is B, the signal at pin 2 is B·$\overline{C}$, the signal at pin 3 is C and the signal at pin 5 is C·$\overline{A}$. A timing diagram showing these logical signals is shown in FIG. 8 and explained below.

Analog multiplexer 134 includes output pins 14, 15 and 4 as well as an input pin 11. When a high signal is applied at pin 11, analog multiplexer 134 electrically connects pins 13 and 14, pins 1 and 15, and pins 3 and 4. When a low signal is applied to pin 11, analog multiplexer 134 connects pin 12 to pin 14, pin 2 to pin 15 and pin 5 to pin 4. A transistor circuit shown within a dashed line 136 controls whether a high or low signal is applied to pin 11 via a line 138. Transistor circuit 136 includes a transistor 140 connected in series with a resistor 142 between a voltage source V2 and ground. A resistor 144 is connected at one end to the base of transistor 140 and is connected at the other end to a capacitor 146, a resistor 148, and a resistor 150. The opposite ends of capacitor 146 and resistor 148 are connected to ground. The opposite end of resistor 150 is connected to a diode 152 and to a capacitor 154. The opposite end of diode 152 is connected to ground. The opposite end of capacitor 154 is connected to the output of inverter 120.

In operation, when motor 102 is starting up or at slow speed, the output of inverter 120 is a signal having a relatively low frequency. The low frequency signal is unable to render transistor 140 conductive so that the voltage from source V2 is applied to pin 11 as a high signal. Analog multiplexer 134, therefore, connects pin 13 to pin 14, pin 1 to pin 15, and pin 3 to pin 4 during start-up and low speed operation. During high speed operation of motor 102, however, the output signal of inverter 120 has a high frequency. This high frequency signal charges capacitor 146 and renders transistor 140 conductive. This causes the voltage from voltage supply V2 to flow through transistor 140 to ground which causes a low signal to be applied to pin 11 of analog multiplexer 134. Accordingly, when motor 102 is operated at higher speeds, analog multiplexer 134 connects pin 12 to pin 14, pin 2 to pin 15 and pin 5 to pin 4. The predetermined speed at which analog multiplexer 134 converts from the first mode of operation where a high signal is applied to pin 11 to the second mode of operation where a low signal is applied to pin 11 is chosen by the values selected for the components of transistor circuit 136. Those skilled in the art will consider the design requirements of the particular motor selected to determine the appropriate cross-over point for the two modes of operation and select the components of transistor circuit 136 accordingly.

The output of analog multiplexer 134 at pins 14, 15 and 4 is connected respectively to jumper lines 160, 162 and 164. Each of jumper lines 160, 162 and 164 is connected to a forward terminal 166 and to a reverse terminal 168. Each of terminals 166 has a corresponding terminal 166' and each of terminals 168 has a corresponding terminal 168'.

Jumpers 170 are adapted to be connected between terminals 166 and 166' to operate motor 102 in a forward direction. Jumpers 170 are also adapted to be connected between terminals 168 and 168' to operate motor 102 in a reverse direction. Lines 172, 174 and 176 lead away from terminals 166' and 168'. When motor 102 is operating in the forward direction, lines 172, 174 and 176 are connected, respectively, to jumper lines 160, 162 and 164. When motor 102 is operating in the reverse direction, lines 172, 174 and 176 are connected, respectively, to jumper lines 164, 160 and 162.

Lines 172, 174 and 176 are connected at the other end to an input of NAND gates 178, 180 and 182, respectively. These NAND gates may have an additional input connected to a pulse width modulator 183 if it is desired to operate motor 102 in a pulse width modulated mode. The operation and connection of pulse width modulator 183 within circuit 100 is commonly understood by those skilled in the art without further discussion. The output of NAND gates 178, 180 and 182 are connected to the inputs of inverters 184, 186 and 188, respectively. Inverters 184, 186 and 188 control power transistor circuits 110, 108 and 106, respectively, to thereby respectively control the energization of windings WC, WB and WA.

FIG. 7 also includes a load dump circuit or other protection circuit shown within a dashed line 190 which detects and dissipates any large surges in the electrical power supply to circuit 100. Such an electrical surge could occur, for example, if the battery in an automobile was receiving a high charge current when one of the cables leading to the battery was disconnected from the battery. In this event, protection circuit 190 would draw down the voltage applied to the inputs of inverters 184, 186 and 188 so that each of these inverters would output a high signal rendering power transistor circuits 110, 108 and 106 conductive to simultaneously energize each of windings WC, WB and WA. During such a period of time, rotation of the rotor in motor 102 may be interrupted. However, by using all of the windings in this way, the excess energy carried by the surge in electrical power is dissipated to prevent electrical damage to logic circuit 100.

FIG. 8 shows the timing diagram for the signals output by logic network 118 in FIG. 7. The top timing wave form A is output by logic circuit 118 and applied to pin 13 of analog multiplexer 134. Likewise, the timing wave form A·$\overline{B}$ is applied to pin 12, timing wave form B is applied to pin 1, timing wave form B·$\overline{C}$ is applied to pin 2, timing wave form C is applied to pin 3, and timing wave form C·$\overline{A}$ is applied to pin 5. It will be recognized that the timing diagrams shown in FIG. 8 correspond to the energization periods of windings WA, WB and WC. In particular, during low speed operation, winding WA is energized with current during the 180° period indicated by timing wave form A. Likewise, windings WB and WC are energized with current during the 180° periods indicated by timing wave forms B and C, respectively. During higher speed operation, when there is a low signal applied to pin 11 of analog multiplexer 134, winding WA is energized during the 120° period indicated by timing wave form A·$\overline{B}$, winding WB is energized during the 120° period indicated by timing wave form B·$\overline{C}$, and winding WC is energized during the 120° period indicated by timing wave form C·$\overline{A}$.

Accordingly, FIG. 8 shows the two modes of operation under which circuit 100 of FIG. 7 is operated. In the first mode of operation during start up and at low speeds, the windings of motor 102 are energized in overlapping 180° energization periods. During higher speed operation, circuit 100 changes to a second mode of operation where the energization periods for the windings are non-overlapping 120° periods. As is seen from the timing diagram shown in FIGS. 3 through 6, the timing diagrams in FIG. 8 can be further adjusted to begin the energization periods a few degrees earlier than those shown in FIG. 8. For example, each of the energization periods could be set to begin 10° before that shown in FIG. 8. This could readily be accomplished with the circuitry of FIG. 7 by moving the position of hall devices HA, HB and HC by an amount corresponding to 10°.

Although the invention has been described with respect to three phase motors, it is applicable to single phase motors, such as in co-assigned application Ser. No. 08/469,200, filed Jun. 6, 1995, titled "Circuit, Motor and Method Generating a Signal Representing Back EMF in an Energized Motor Winding," the entire disclosure of which is incorporated herein by reference.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor assembly comprising:

a stationary assembly and a rotatable assembly in magnetic coupling relation thereto, the stationary assembly including three windings, the rotation of the rotatable assembly inducing a back EMF in the windings;

a position sensor for sensing an angular position of the rotatable assembly relative to the stationary assembly;

a circuit for producing a speed signal dependent on the rotational speed of the rotatable assembly;

a converter having at least three switches, each switch for commutating one of the windings, said converter adapted to be coupled to a power supply, for commutating each of the windings with a voltage;

wherein the converter is responsive to the angular position of the rotatable assembly as sensed by the position sensor and responsive to the speed signal produced by the circuit for commutating each of the windings according to a preselected sequence during successive commutation periods;

wherein the converter has a first mode of operation when the rotational speed of the rotatable assembly is below a predetermined value and has a second mode of operation when the rotational speed of the rotatable assembly is above the predetermined value;

wherein in the first mode the converter energizes each of the windings with the voltage such that the commutation period for each winding overlaps the commutation period for the previously commutated winding so that two windings are simultaneously energized during a transition between successive commutation periods;

wherein in a second mode the converter energizes each of the windings with the voltage such that the commutation period for each winding do not overlap the commutation period for another winding such that a timing of the commutation periods of the second mode is different than a timing of the commutation periods of the first mode;

wherein in the first mode the converter energizes each of the windings with the voltage during a first commutation period for each winding when the back EMF induced in such winding has a polarity opposite to a polarity of the voltage supplied by the converter for commutating such winding, and in the second mode the converter energizes each winding with the voltage during a second commutation period comprising approximately the first two thirds of the first commutation period, whereby operating the motor assembly in the first and second modes is more efficient than operating the motor assembly in only the first mode and whereby operating the motor assembly in the first and second modes produces higher startup torque than operating the motor assembly in only the second mode; and wherein the first commutation period for each winding during the first mode is about 120–150 electrical degrees and the second commutation period for each winding during the second mode is about 120 electrical degrees.

2. The motor assembly of claim 1 wherein the position sensor comprises a Hall effect device on the stationary assembly for generating a position signal representative of the angular position of the rotatable assembly and wherein the converter is responsive to the position signal for energizing the windings in advance of the commutation periods.

3. The motor assembly of claim 1 wherein the position sensor includes a circuit for sensing the back EMF induced in a selected winding and for generating as a function of the sensed back EMF a position signal representative of the angular position of the rotatable assembly and wherein the converter is responsive to the position signal for energizing the windings in advance of the commutation periods.

4. The motor assembly of claim 1 wherein the converter comprises a PWM circuit for applying a pulse width modulated DC current to the windings during the commutation periods and further comprising a protection circuit detecting and dissipating surges in the power supply whereby the PWM circuit is protected from detected surges.

* * * * *